Patented Mar. 20, 1945

2,371,707

UNITED STATES PATENT OFFICE 2,371,707

NITROGEN GENERATING CHEMICALS

Edwin T. Rainier, Nutley, and David M. French, Passaic, N. J., assignors to United States Rubber Company, New York, N. Y., a corporation of New Jersey No Drawing. Application May 27, 1942,
Serial No. 444,746

4 Claims. (Cl. 252—188.3)

The present invention relates to chemicals, suitable as chemical blowing or gassing agents for generating or liberating nitrogen gas, and useful particularly for the making of gas-expanded rubber products of both the cellular and the sponge types.

Ammonium nitrite has been used by the rubber industry in making gas-expanded rubber in the form of a solution, in the form of a compound with zinc oxide, and it has been prepared in the rubber by the interaction of ammonium salts and nitrites. Ammonium nitrite, being an unstable material liberating a gas, cannot be readily transported as a solution since the container must have a vent to relieve the pressure and a liquid could spill through this vent. Hence, a solid form is desirable. This invention presents such a form of ammonium nitrite in the nature of an exceptionally useful combination with magnesia.

According to the investigation a composition of matter is formed which consists of a thixotropic magnesium oxide gel containing ammonium nitrite in the aqueous phase. The invention further includes the use of such a gel to form gas-expanded products. Preferably, the gel should contain, by weight, at least 25% of ammonium nitrite, and at least 8% of magnesium oxide. The magnesium oxide is added in desired proportion to a concentrated solution of ammonium nitrite. After a time, which depends on the relative amount of magnesia used, the mixture sets to a semi-solid material whose consistency depends on the proportion of magnesia.

The following example illustrates a preparation of the magnesia-ammonium nitrite solution gel:

Example

| | |
|---|---|
| Sodium nitrite _____ lbs__ | 5¾ |
| Ammonium sulfate _____ lbs__ | 5½ |
| Concentrated ammonia solution _____ cc__ | 425 |
| Water _____ cc__ | 1830 | were mixed and heated at approximately 40° C. for about 45 minutes. The resulting sodium sulfate was then filtered off and washed with a solution consisting of

| | |
|---|---|
| Concentrated ammonia solution _____ cc__ | 150 |
| Water _____ cc__ | 400 |

The wash water was added to the filtrate obtained above. A total of 3.8 liters of liquid was obtained, having a pH of 8.7. One cc. of this liquid, when heated, gave 210 cc. of gas at room conditions when collected over water. Four portions of this liquid were formed of 700 cc. each and "light" magnesium oxide in the amounts given below was added to each. The specific gravity of the liquid was known to be 1.3:

| | Wt. MgO | Per cent MgO | Time of gelation | "Viscosity" | Gas evolution |
|---|---|---|---|---|---|
| | *Grams* | | | | |
| a | 112 | 11 | 3 hours | .7 | 105 |
| b | 124 | 12 | 1 hr. 50' | 1.6 | 107 |
| c | 136 | 13 | 1 hr. 20' | 2.9 | 103 |
| d | 148 | 14 | 1 hour | 5.7 | 100 |

By "viscosity" is meant the pressure in kg./cm.$^2$ necessary to force a cylindrical steel rod of ⅜" diameter down one centimeter through the gel. On continuous shaking for 21 hours the "viscosity" decreased but none of the gels become sufficiently mobile to flow. The gels become much more viscous as the proportions of magnesia increase. Heating to 50° C. does not appear to make the gels more fluid.

The gas evolution is the number of cc. of gas measured at room conditions which can be collected over water by heating. All of the nitrogen present in the ammonium nitrite solution is not recovered from the gel. Possibly a side reaction takes place,

$$Mg(OH)_2 + 2NH_4NO_2 \rightarrow Mg(NO_2)_2 + 2NH_3 + 2H_2O$$

The magnesia-ammonium nitrite gel may be used in rubber as the gas-producing substance in forming expanded rubber articles (soft, elastic or hard), either of the closed-cell type (cellular rubber) or of the interconnecting cell type (sponge). The substance is incorporated into the rubber along with the other necessary and desirable compounding ingredients, and the rubber mix is subjected to the usual control treatments to produce cellular rubber or sponge. The rubber may be natural rubber or artificial rubber that has substantially the physical properties of natural rubber.

The present gassing agents may also be used, as chemical reagents, to introduce nitrogen into other chemicals.

For use as a chemical blowing agent for rubber, the present chemical provides a number of advantages:

(a) Being a solid, it does not circulate, and evaporation of water and ammonia is largely prevented except at the surface. This is an advantage in contrast to a solution of ammonium nitrite.

(b) The magnesia being present in excess, provides a stabilizer for the ammonium nitrite.

(c) The material can be milled directly into the rubber without previous grinding.

(d) On heating the material only magnesium oxide and possibly small quantities of sodium and ammonium sulfate may remain. Since magnesium oxide is often used in rubber, the material has an advantage over a mixture of ammonium salts and nitrites which leave a large residue of the product of metathesis.

The invention may be employed in the production of various gas-expanded products derived from plastics other than rubber, but is notably useful in the production of gas-expanded rubber products.

Having thus described our invention, what we claim and desire to protect by Letters Patent is:

1. A composition which consists mainly of a thixotropic magnesium oxide gal containing ammonium nitrite in the aqueous phase.

2. A chemical blowing agent for making gas-expanded products which consists mainly of a thixotropic magnesium oxide gel containing at least 25% by weight of ammonium nitrite.

3. A chemical blowing agent for making gas-expanded products which is a thixotropic magnesium oxide gel containing at least 25% by weight of ammonium nitrite, and at least 8% by weight of magnesium oxide, the balance of the composition being mainly water.

4. A process which comprises adding magnesia to a concentrated aqueous solution of ammonium nitrite, and allowing the mix to set to a thixotropic gel.

EDWIN T. RAINIER.
DAVID M. FRENCH.